Nov. 14, 1961 J. H. GREGORY ET AL 3,009,152
LEAD COMPUTING AND SCANNING ANTENNA
Filed Aug. 9, 1955 3 Sheets-Sheet 1

INVENTORS
JOHN H. GREGORY
JOHN M. BOYLE
BY
ATTORNEYS

Nov. 14, 1961   J. H. GREGORY ET AL   3,009,152
LEAD COMPUTING AND SCANNING ANTENNA
Filed Aug. 9, 1955   3 Sheets-Sheet 2

INVENTORS
JOHN H. GREGORY
JOHN M. BOYLE
BY
ATTORNEYS

Nov. 14, 1961  J. H. GREGORY ET AL  3,009,152
LEAD COMPUTING AND SCANNING ANTENNA
Filed Aug. 9, 1955  3 Sheets-Sheet 3

INVENTORS
JOHN H. GREGORY
JOHN M. BOYLE
BY
ATTORNEYS

3,009,152
LEAD COMPUTING AND SCANNING ANTENNA
John H. Gregory and John M. Boyle, China Lake, Calif., assignors to the United States of America as represented by the Secretary of the Navy
Filed Aug. 9, 1955, Ser. No. 527,427
4 Claims. (Cl. 343—705)
(Granted under Title 35, U.S. Code (1952), sec. 266)

The invention described herein may be manufactured and used by or for the Government of the United States of America for governmental purposes without the payment of any royalties thereon or therefor.

The invention relates to a lead computing and scanning radar antenna.

Modern fighter aircraft carry a lead computing optical gun and rocket fire control system which requires target range information for accurate solution of the fire control equations. Several "ARO" (automatic-range-only) radar sets have therefore been developed for such use, functioning to find the range to the target by locking on to and tracking in range any isolated target within a fixed maximum range of the aircraft, and within a cone of approximately 20° included angle whose axis is parallel to and substantially coincident with the boresight line of the aircraft. The antenna conventionally employed in such ARO radar sets is of circular parabolic reflector type, fixedly mounted, and of small aperture to provide a radiation pattern or beam broad enough to illuminate the target aircraft under the condition of maximum lead angle. The wide beam width of such a radar antenna, however, is accompanied by low gain, resulting in a comparatively short maximum radar tracking range. Where apparatus of greater size, weight and complexity can be accommodated, as in larger aircraft, the radar range can of course be increased greatly by increasing the size and gain of the radar antenna and servoing it, accordance with conventional practice, so that it is always pointed at the target when a lead course is being flown.

The present invention makes it possible to greatly improve the maximum range capability of fighter aircraft fire control systems, without internal modification of the ARO radar, by providing a novel radar antenna assembly which in effect computes and moves the antenna beam through a lead angle, i.e., moves the axis of its beam as a function of angular motion of the aircraft during entry into a lead angle attack, in such manner as to continuously point the beam substantially toward the target during such entry and attack.

ARO radar is normally used for only a few seconds at a time, that is, when target-lead course entry and an actual attack is being made. To utilize such radar during a greater portion of the aircraft flight time, the radar antenna assembly in accordance with the present invention also scans in azimuth and elevation in a two bar "B" scan, and the data is presented to the pilot on a small, high intensity cathode ray tube. The modified ARO radar can then additionally be used continuously for obstacle detection, homing, and location of aircraft during poor visibility conditions.

One object of the invention is to provide a simple device which will keep a radar antenna beam within a few degrees of the target and thus allow a much narrower beam and higher gain radar antenna.

Another object is to provide a scanning antenna which allows the pilot of an aircraft to use ARO radar throughout the flight for detection of targets, navigation, and the like, whereas previously the radar was used only during the few seconds of the firing run.

A further object is to provide a radar antenna which will double the tracking range over that of the automatic range-only radar fixed antenna.

A still further object is to provide a lead computing radar antenna that also scans in azimuth.

Still another object is to provide a radar antenna with a reflector that acts as a gyroscope.

Other objects and many of the attendant advantages of this invention will be readily appreciated as the same becomes better understood by reference to the following detailed description when considered in connection with the accompanying drawings wherein.

Figure 1:
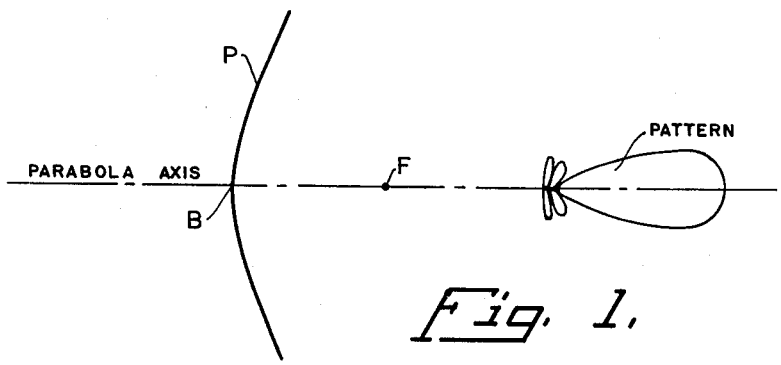
FIG. 1 is a diagrammatic illustration of a parabolic reflector radar antenna and its radiation pattern.
Figure 2:
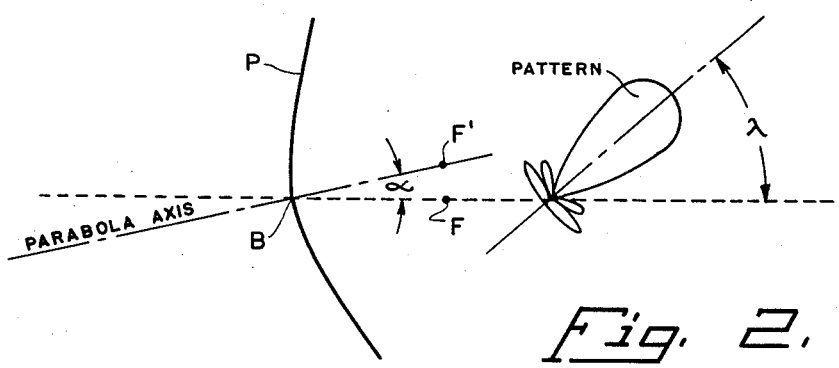
FIG. 2 is a diagrammatic view of a parabolic reflector radar antenna showing the relative orientation of its radiation pattern when the parabolic reflector is angularly displaced.

The operating principles of the lead computing antenna are as follows: In FIG. 1, when a circular parabolic reflector P, having a vertex B through which passes the parabola axis, is illuminated at its focal point by electromagnetic radiation, the radiation is reflected in a beam and several side lobes (illustrated by the pattern) which are symmetrical about the axis of the parabola. If, as in FIG. 2, the parabolic reflector P is rotated about a point at or near its vertex B until the parabolic axis of the reflector P forms an angle $\alpha$ with a line passing through vertex B and the point of illumination F, then the focal point of the reflector P shifts to F', and the axis of the antenna pattern shifts, in the direction that the reflector P was rotated, by an angle $\lambda$ which is equal to $(\alpha[1+K])$. The constant K is equal to slightly less than unity for the shape of parabolas commonly used for reflection. An approximation can be made, therefore, that $\lambda \cong 2\alpha$. As the angle $\alpha$ increases, or as the pivot point is displaced from vertex B, the beam shape and gain of the antenna is degraded and the intensity of the side lobes is increased considerably, but for the values of the angle $\alpha$ or for pivot point positions as used in the described embodiments these effects are not serious.

Figure 3:
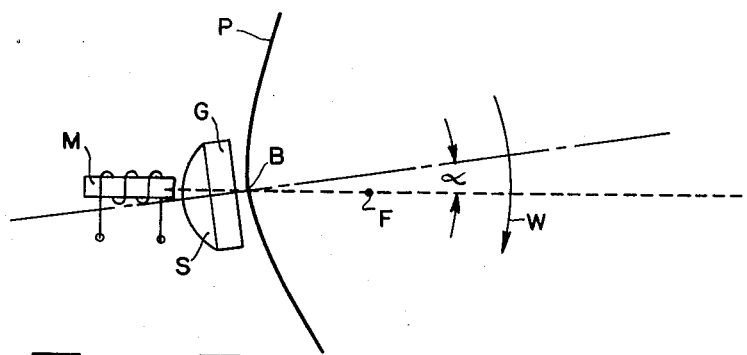
FIG. 3 is a diagrammatic illustration of a lead-computing radar antenna with a gyroscope attached to the reflector, and an erecting arrangement.

A gyroscope G is fastened to the back of the parabolic reflector P, as shown schematically in FIG. 3, so that the spin axis of the gyroscope coincides with the axis of the parabola. Attached to the rear of the gyroscope rotor is a spherical shell or eddy current cup S of high conductivity, non-magnetic metal whose center of curvature in this instance lies at vertex point B of the parabolic reflector P. The gyroscope and reflector assembly is journaled for movement about the said center of curvature, in the instance about point B. The reflector illumination feed at point F and the pivot point are fixed in position relative to the aircraft. A magnet M whose direction of magnetization lies on a line passing through the points B and F is placed directly behind the eddy current cup S and is also rigidly attached to the aircraft. The forward end of the magnet M is concave to match the radius of curvature of the eddy current cup S so that the magnetic flux passes nearly perpendicularly through the cup S. If the aircraft carrying the modified ARO radar turns away from a dead-ahead target at an angular rate $\omega$ to enter a lead-angle pursuit course, the gyroscope G with the reflector P attached tends to remain stabilized in space with respect to direction. The field axis of magnet M then is not aligned with the spin axis of the gyroscope G and eddy currents are induced in the areas of the eddy current cup S where the magnetic flux varies as the areas pass under the magnet M. These eddy currents generate a secondary magnetic field which reacts against the magnet M to produce a torque on the eddy current cup S and gyro G perpendicular to angular rate W and the gyro spin axis. The direction of this torque always tends to precess the gyro G to realign its spin axis with the line passing through points B and F. The gyro G never realigns itself completely, for then the precessing torque would disappear. Instead, the gyro G generates an angle $\alpha$ proportional to rate $\omega$. The reflector correspondingly moves through a like angle $\alpha$, and the antenna beam through substantially twice that angle, in the same direction as the aircraft turns. The intensity of magnet M can be changed by varying the magnet coil current, to alter the ratio of antenna beam lead angle to aircraft turn rate where this appears desirable. (In most instances, however, since lead angle pursuit time is short, the antenna beam lead angles provided by the described apparatus with fixed magnet coil current will be exact enough.) With rockets or guided missiles, for example, the range voltage from the ARO radar can be used to vary the magnet coil current in such a manner as to yield improved tracking at long range.

Figure 4:
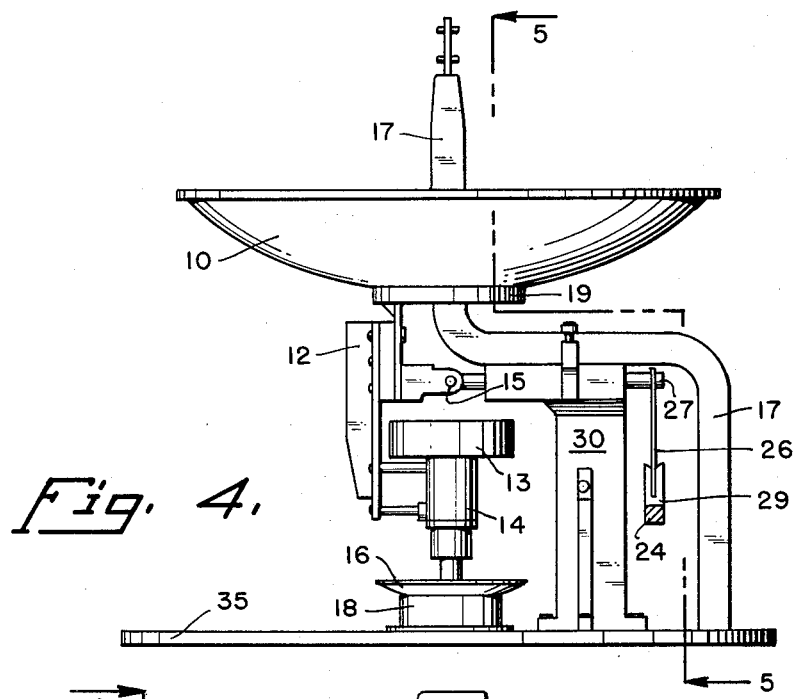
FIG. 4 is a side view showing the major structural parts of one embodiment of a lead computing and scanning antenna taken along the line 4—4 of FIG. 5.
Figure 5:
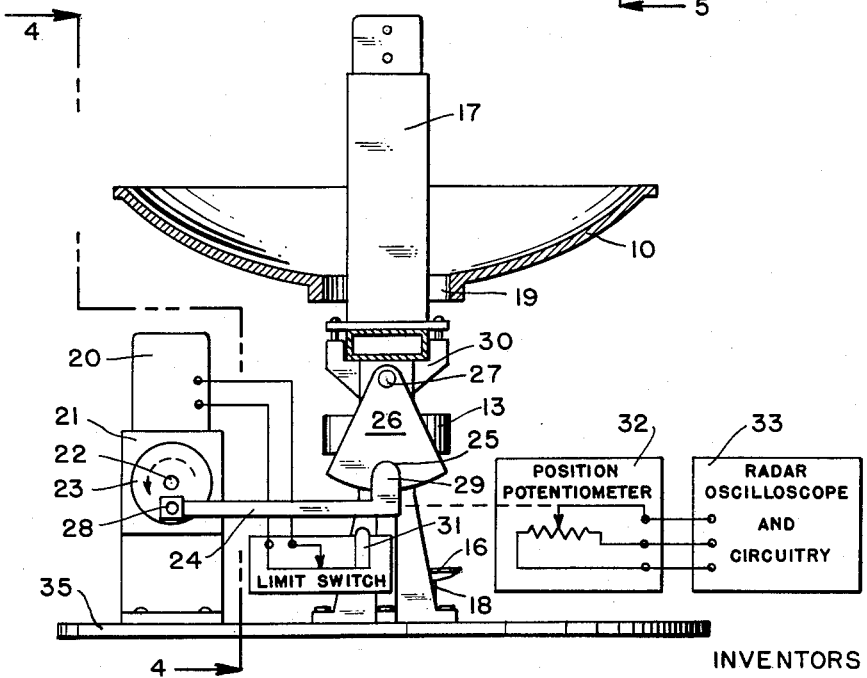
FIG. 5 is a partially diagrammatic and cross-sectional top view of the radar antenna taken along the line 5—5 of FIG. 4, illustrating the scanning mode of operation of the antenna.

In FIGS. 4 and 5 is shown one form of the lead-computing and scanning antenna of the invention, where circular parabolic reflector 10 has attached to it, by means of a connecting member 12, FIG. 4, a gyroscope unit comprising a gyroscope rotor 13, gyro drive motor 14 and a spherical shaped eddy current cup 16. The entire reflector and gyro assembly is gimbaled on shafts 15 and 27, providing two degrees of freedom about the virtual universal pivot point at the intersection of these shafts. Waveguide 17 passes through parabolic reflector 10 at its center opening 19 and is attached to a support member 30 mounted on a base 35. An erecting magnet 18 is mounted on base 35 in line with the pivot point and waveguide 17. The antenna azimuth pivot shaft 27 passes through and is supported by member 30.

For the scanning mode of operation of this lead computing and scanning antenna, the erecting magnet 18 is de-energized. The reflector and gyro assembly 10–16 is driven in azimuth by a separate motor 20 and reduction gear 21 as shown in FIG. 5. Attached to the reduction gear output shaft 22 is a crank 23 and connecting rod 24. The end 29 of the connecting rod 24 opposite from the crank 23 is shaped to engage a notch 25 midway along the periphery of a sector cam 26. The shaft 27 on which the cam 26 is mounted forms the azimuth pivot for the gyro and reflector assembly. The throw of the crank 24 is such as to give an angle $\alpha$ of plus or minus 10 degrees in azimuth with a resulting angle $\lambda$ of plus or minus 20 degrees. The drive motor 20 is reversible. Phosphor bronze friction washers may be used on either side of connecting rod 24 where it rides on crank pin 28. These washers provide sufficient friction between crank pin 28 and connecting rod 24 so that when the crank 23 is rotating in the direction indicated by the dotted arrow, the end 29 of connecting rod 24 is held in notch 25 on sector cam 26. When the motor 20 is reversed in preparation for the lead computing phase of operation, the friction then tends to lift the end 29 of connecting rod 24 out of the notch 25 on cam 26 and completely disengage the drive so that the gyro and reflector assembly is released for lead computing. As the connecting rod 24 lifts out of the notch 25 completely, it actuates a normally closed limit switch 31 and stops the drive motor 20 during the lead computing function.

When the reflector and gyro assembly is oscillated in azimuth during the scan function, the gyro 13 tends to precess the assembly either up or down upon reversal of azimuth movement, depending on the direction of azimuth movement at that time with respect to the direction of gyro rotation. Elevation stops (not shown) are provided to limit movement of the gyro and reflector assembly to plus or minus 5 degrees in elevation. During scan, therefore, the antenna beam sweeps in azimuth in one direction approximately 40 degrees with the beam at $-10$ degrees in elevation, then reverses direction in azimuth and rapidly jumps to $+10$ degrees in elevation for the return 40 degrees in azimuth. This is termed a 2 bar scan in radar nomenclature, i.e., the radar scans a volume of plus or minus 20 degrees in azimuth and plus or minus 10 degrees in elevation, centered about the axis of the aircraft. The stops in elevation for scan may, if desired, be arranged to be disengaged during lead computing if the angle $\lambda$ in elevation is expected to exceed plus or minus 10 degrees.

The movable arm of a linear potentiometer 32 is attached to the cam end 29 of connecting rod 24, FIG. 5, to indicate azimuth on a small, high-intensity, type "B" radar oscilloscope 33 in the pilot's cockpit.

The entire antenna unit, including the electronic circuitry used to operate the indicator oscilloscope 33, may be pressurized inside a case (not shown). The indicator oscilloscope 33, also pressurized, and antenna unit may connected by a hose which carries the necessary wiring so that both units may form a pressurized system which is impervious to changes in altitude or climate.

Figure 6:
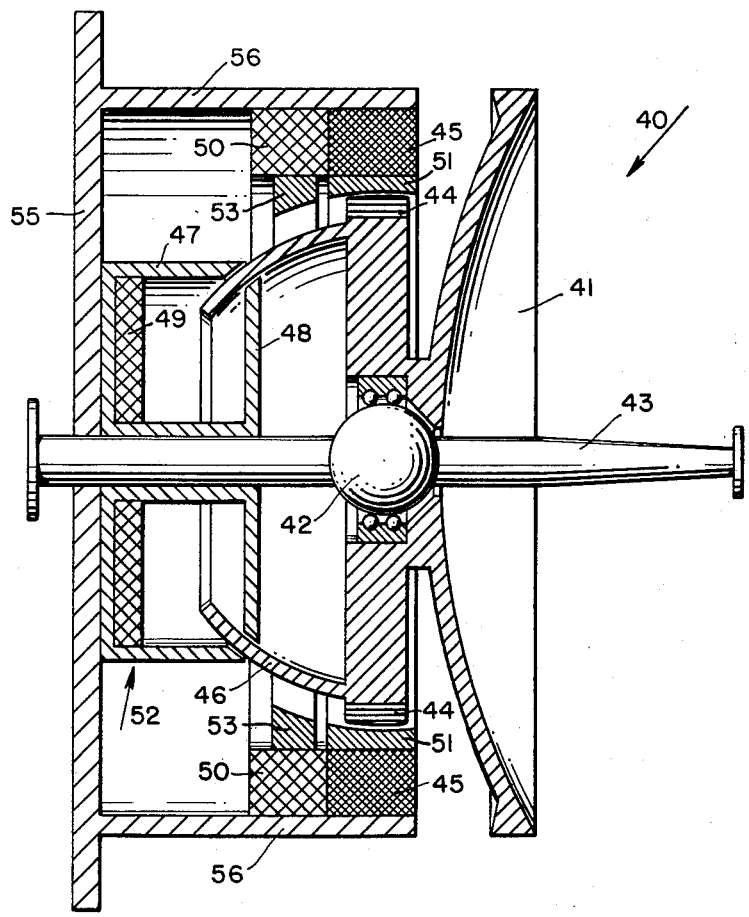
FIG. 6 is a cross-sectional side view of another embodiment of the invention where the reflector acts also as a gyroscope.

Another embodiment incorporating principles of the present invention, intended for use with ARO radar in fighter aircraft as described, is illustrated in FIG. 6, wherein the novel lead-computing antenna assembly 40 automatically deflects its beam to maintain radar-illumination of the target during the attack phase, and wherein the antenna assembly also functions to enable radar search and tracking of the target in elevation and azimuth prior to the attack phase. This antenna consists of a parabolic reflector 41 which may be machined from cast aluminum for strength. The reflector 41 is supported substantially at its vertex by a spherical self-aligning ball bearing 42 which allows the reflector to spin, and also to pivot in any direction. The reflector 41 is illuminated by a waveguide feed 43, such as Cutler-type feed, which passes through the center of and supports the ball bearing 42. Waveguide 43 also passes through magnet 52 and base 55, which base supports both the magnet and the waveguide. Attached to the back of the reflector 41 is a ring-shaped alnico magnet 44 which is magnetized with a north and south pole spaced 180 degrees apart on its periphery. Stationary four-pole two-phase induction motor windings 45 mounted on sides 56 on base 55 surround the magnet 44, the soft iron ring stator 51 serving to provide a suitably small air gap. Energizing these windings 45 will cause the reflector 41 and magnet 44 to spin as a synchronous motor and act as a gyroscope. Attached to the back of the magnet 44 is a hollow hemisphere 46 of aluminum, for example, with a large hole in its center where waveguide 43 and magnet pole piece 48 pass through. Magnet pole pieces 47 and 48 inside and outside of the hemisphere 46 create a magnetic field which passes perpendicularly through the hemisphere 46 when the gyro erecting winding 49 of magnet 52 is energized. The erecting torque created by the eddy currents induced in the hemisphere 46 is proportional to the current in the gyro erecting winding 49. The antenna assembly then forms a rate measuring gyroscope, functioning to effectively compute lead and to deflect the antenna beam axis as in the earlier described embodiment. In addition, the parabola axis of the parabolic reflector 41 does not coincide with its spin axis. Instead, it is offset so that the half power point of the antenna beam lies along the spin axis, a conventional technique to provide conical scanning. Thus, any target intercepted by the beam will reflect a signal which is amplitude-modulated at spin frequency unless it lies along the spin axis of the antenna 40, in which instance the conically-scanning antenna is said to be pointed toward the target. (In the case of the first described embodiment, the pointing axis of the reflector coincides with the parabola axis.) This process of "conical scanning" provides information as to the target's angular position, since such position corresponds to signal modulation phase relative to a reference orientation of the reflector about its pointing axis. This relative phase condition can be utilized directly for target tracking in the described novel antenna assembly simply by amplifying the modulation and applying it to four-pole two-phase torquer windings 50 on sides 56.

The magnetic field induced by the torquer windings 50 in the soft iron ring stator 53 would then rotate at the same speed as the alnico rotor 44. The phase difference between the torquer windings flux and the alnico rotor flux is determined by the direction of the target relative to the spin axis of the antenna spinning reflector-gyro 41. The torque generated by the reaction of these fluxes against each other will tend to precess the reflector-gyro 41 until the target is centered on the spin axis and the modulation disappears. For use in the attack phase of operation, a simple fire control system can be provided, as in the first described embodiment, by supplying the necessary erection coil current which will allow the gyro formed by the spinning reflector 41 to compute sufficient lead to compensate for the time of flight of the particular type of rounds to be fired. No external phase detectors, servo motors or expensive instrumentation on the antenna is necessary. Search scanning can be accomplished by cutting off the erection coil current and alternately shifting the phase of the torquer winding current.

This system in conjunction with a radar transmitter and receiver, appropriate indicator, and ballistics computer may be used to compute and direct an aircraft on the correct firing course for guns, rockets, missiles and the like.

Obviously, many modifications and variations of the present invention are possible in the light of the above teachings. It is therefore to be understood that within the scope of the appended claims the invention may be practiced otherwise than as specifically described.

What is claimed is:

1. An antenna assembly, for use in a radar and fire control system of an aircraft which operates to enter and execute a lead-angle attack, against a moving target, wherein a boresight line of said aircraft departs from a line-of-sight to said target, and wherein a radar target lock-on condition must be maintained during entry and execution of such attack, said lock-on condition requiring continuous radar illumination of said target, said antenna assembly comprising: a supporting structure, wherein is defined a reference axis, adapted to be mounted in an aircraft with said reference axis fixed in position substantially parallel to the boresight line of said aircraft; a circular parabolic reflector, wherein is defined a pointing axis, mounted upon said supporting structure with said pointing and reference axes intersecting at a virtual pivot, and journaled to provide said reflector two degrees of freedom about said virtual pivot, said reflector having a mean position in which said pointing and reference axes are collinear; radar energy-guiding means including a feed termination facing said reflector; a gyroscopic rotor, wherein is defined a spin axis, supported by said reflector with said spin and pointing axes in fixed alignment; means for spinning said rotor about said spin axis; and rotor restraint means comprising an electromagnet and an eddy-current cup associated therewith; said eddy-current cup being secured to said rotor, having circular symmetry relative to said spin axis and having a substantially hemispherical configuration concentric to said virtual pivot; said electromagnet being secured to said supporting structure and providing a magnetic field which is symmetrical about said reference axis and which induces eddy currents in said cup, resulting in torques tending to precess the spin and pointing axes to collinearity with said reference axis; said antenna assembly operating to position and maintain said reflector pointing axis in collinearity with said supporting structure reference axis during constant spatial direction of said supporting structure reference axis, as during straight flight of said aircraft; and said antenna assembly further operating to angularly displace said pointing axis in the direction of departure of said reference axis and by an amount substantially proportional to the rate of turn of said reference axis, as during entry into a lead-angle attack by said aircraft against a moving target.

2. An antenna assembly as defined in claim 1, wherein said reflector is supported and journaled substantially at its vertex by means including a self-aligning spherical bearing member.

3. An antenna assembly as defined in claim 2, wherein said reflector is secured to said gyroscopic rotor to spin therewith.

4. An antenna assembly as defined in claim 3, wherein said radar energy-guiding means extends through said bearing member and through said reflector.

References Cited in the file of this patent
UNITED STATES PATENTS
2,585,579    Norden _____ Feb. 12, 1952